US009652364B1

(12) United States Patent
Kaila et al.

(10) Patent No.: US 9,652,364 B1
(45) Date of Patent: May 16, 2017

(54) CLOUD SERVICE FOR MOBILE TESTING AND DEBUGGING

(71) Applicant: Amazon Technologies, Inc., Seattle, WA (US)

(72) Inventors: Ashish Kaila, Kirkland, WA (US); Kazuyoshi Kato, Seattle, WA (US); Arul Murugan Kumaravel, Redmond, WA (US); Deeshen Dhirendra Shah, Seattle, WA (US); Jeremy Hong-wei Wong, Seattle, WA (US); Ning Zhang, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 112 days.

(21) Appl. No.: 14/656,638

(22) Filed: Mar. 12, 2015

(51) Int. Cl.
*G06F 11/00* (2006.01)
*G06F 11/36* (2006.01)

(52) U.S. Cl.
CPC ........ *G06F 11/366* (2013.01); *G06F 11/3688* (2013.01)

(58) Field of Classification Search
USPC ........................................................ 714/46
See application file for complete search history.

(56) References Cited

U.S. PATENT DOCUMENTS 6,119,247 A 9/2000 House et al.
6,637,024 B1 10/2003 Johnson et al.
9,021,443 B1 4/2015 Wang et al.
9,170,922 B1* 10/2015 Lachwani ........... G06F 11/3636
2004/0010778 A1* 1/2004 Kaler .................... G06F 11/362 717/130
2006/0174162 A1* 8/2006 Varadarajan .......... G06F 11/263 714/38.14
2008/0059634 A1* 3/2008 Commons ......... G06F 17/30887 709/225
2012/0221893 A1* 8/2012 Bai ......................... H04L 43/50 714/27
2013/0080832 A1* 3/2013 Dean ................... G06F 19/3412 714/32
2014/0136667 A1 5/2014 Gonsalves et al.
2014/0281730 A1* 9/2014 Chazan ............... G06F 11/3636 714/38.1
2014/0355531 A1* 12/2014 Han .................... H04L 27/2613 370/329

(Continued)

OTHER PUBLICATIONS

U.S. Appl. No. 14/656,584, U.S. Patent Application, filed Mar. 12, 2015, Titled: Cross Platform Mobile HTML Debugging.

(Continued)

*Primary Examiner* — Sarai Butler
(74) *Attorney, Agent, or Firm* — Kilpatrick Townsend & Stockton LLP

(57) ABSTRACT

Techniques for providing a cloud mobile device debugging service may be provided. For example, input may be received that is formatted in a particular debugging protocol. The input may be intended for execution on a browser of a mobile device that is remotely hosted with respect to the source of the input. The input may be translated from the particular debugging protocol to a common debugging protocol and provided to the remotely hosted mobile device. A result of executing the translated input with the remotely hosted mobile device may be displayed via a user interface.

19 Claims, 12 Drawing Sheets

Receive input that is formatted in a particular debugging protocol for a browser of a mobile device that is remotely hosted with respect to the source of the input — 902

Translate the input from the particular debugging protocol to a common debugging protocol — 904

Provide the translated input to the mobile device — 906

Provide for display, via a user interface, a simulation of the browser of the mobile device that represents an execution of the translated input — 908

(56) References Cited

U.S. PATENT DOCUMENTS

| | | | | |
|---|---|---|---|---|
| 2015/0074460 | A1* | 3/2015 | Yeh | G06F 11/2284 714/36 |
| 2015/0261658 | A1 | 9/2015 | Burr et al. | |
| 2015/0346982 | A1 | 12/2015 | Johnson et al. | |
| 2016/0048368 | A1* | 2/2016 | McGibney | G06F 3/1454 345/2.3 |
| 2016/0062848 | A1* | 3/2016 | Felse | G06F 11/1469 714/19 |

OTHER PUBLICATIONS 1.0 Debugger—Google Chrome. [online]. Google, Mar. 2015 [retrieved on Mar. 9, 2015]. Retrieved from the Internet: <URL: https://developer.chrome.com/devtools/docs/protocol/1.0/debugger>, 16 pages.

* cited by examiner

CLOUD SERVICE FOR MOBILE TESTING AND DEBUGGING

CROSS-REFERENCE TO RELATED APPLICATIONS

This application is related to and incorporates by reference for all purposes the full disclosure of co-pending U.S. patent application Ser. No. 14/656,584, filed Mar. 12, 2015, entitled "CROSS PLATFORM MOBILE HTML DEBUGGING".

BACKGROUND

More features are becoming available on mobile devices, such as applications that incorporate multimedia functionality such as that of a media file streaming service with a streaming application. Computer technologies are broadening from personal computers to include a variety of mobile devices with many companies offering content and services on this new platform. Companies may utilize websites optimized for mobile browsers and applications for mobile platforms such as Apple iOS®, Android®, and Windows®. However, mobile devices can vary significantly in terms of hardware, software capabilities, screen size, connection speed, core processing unit (CPU), and memory capacities. Developers may utilize hybrid mobile applications that can display hypertext markup language (e.g., HTML) content inside applications but they may be limited to using platform specific tools to debug their content. Additionally, program testers need to test and debug their code on a wide array of mobile devices to ensure good quality on each mobile device platform that can lead to inefficiencies and a lack of real time updates. However, it may be expensive to provide each developer/tester with each type of device for debugging purposes and inconvenient to provide each developer/tester with proprietary emulators that emulate each device. Further, developers/testers may be faced with incompatibility problems caused by different platforms particularly with respect to debugging on the different platforms.

BRIEF DESCRIPTION OF THE DRAWINGS

Various embodiments in accordance with the present disclosure will be described with reference to the drawings, in which.

DETAILED DESCRIPTION

Figure 1:
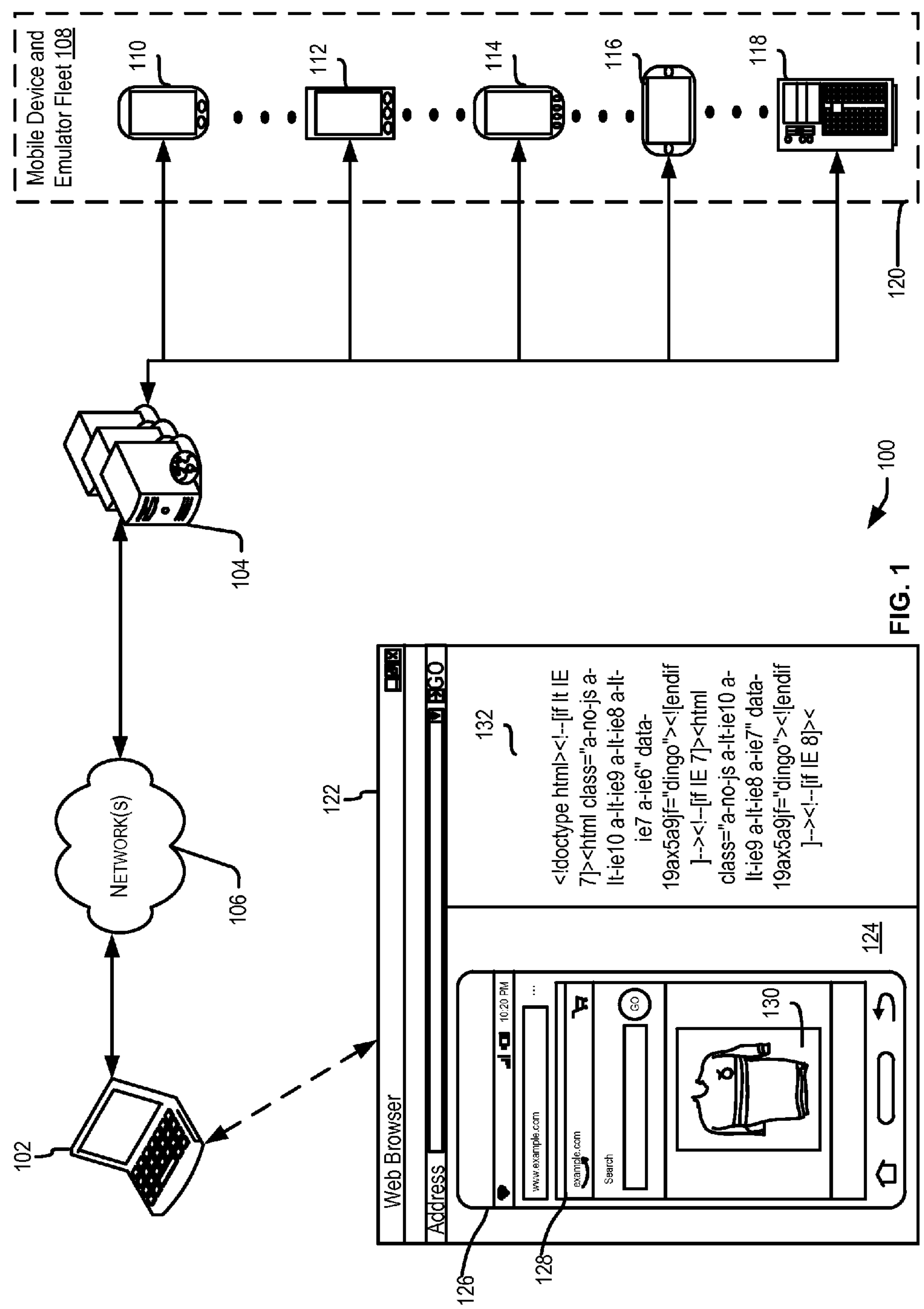
FIG. 1 illustrates an example workflow for a cloud mobile device debugging service, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, techniques for a service that provides mobile testing and debugging for a remotely hosted mobile device that can be rendered and simulated on a local client device. For example, a local agent, such as a web browser based extension, may present a mobile device environment that corresponds to a mobile device that is remotely hosted. A developer, tester, or user can provide input via the web browser that can be relayed by the local agent to a remotely hosted mobile device for remote debugging and testing. The input may be executed on the remotely hosted mobile device and a result of the execution of the input on the remotely hosted mobile device may be rendered in real time to the developer on their local device via the web browser. Further, debugging input may be provided according to one debugging protocol and translated for execution on a remotely hosted mobile device that requires input that corresponds to another debugging protocol. For example, input may be provided according to an Android® protocol, translated to an iOS® protocol and executed on an iPhone® where the execution of the input is displayed on a local client that is remote from the iPhone.® The input may include executable or non-executable configuration information where appropriate (depending on the debugging protocol in question, the provisioned device/emulator, or the programmatic language being utilized by the user). The cloud mobile device debugging service described herein may maintain status information for a plurality of servers that host a variety of mobile devices and emulators for a variety of mobile device. The status information may indicate the availability of remotely hosted mobile devices and emulators thus aiding in fulfilling any launch requests for a particular mobile device/emulator. In embodiments, input corresponding to testing commands may be received via the local agent and provided to a native application running on the remotely hosted mobile device for execution. A result of executing the input or testing commands on the remotely hosted mobile device may be captured, for example by utilizing a media stream such as a video stream, a sequence of screenshots and/or any suitable result capturing technique, and presented for display to a user via the local agent.

To illustrate, consider an example request for a debugging session with a remotely hosted mobile device, such as a particular iPhone model. A developer may utilize a web browser on their local client device for requesting a debugging session with a particular mobile device, such as an Android device, that is remotely hosted. The developer may be presented several options, via a local agent, for requesting the debugging session such as selecting a particular mobile device model or emulator, whether they wish to test in a mobile browser or a particular application on the remotely hosted mobile device, and if there are any parameters to pass with the request. In response to receiving the request, the cloud mobile device debugging service may find an available server hosting the indicated mobile device and form a communication channel between the particular mobile device and the local agent. Thereafter, any debugging or testing input may be communicated by the local agent, utilizing one or more networks, to the particular mobile device that may execute and display a simulation of the executed input on the web browser of the local client via the local agent in real time. This allows a developer/tester to debug mobile browsers and applications for a variety of mobile devices utilizing any web-browsing environment on a local client device. The local agent and cloud mobile device debugging service provide the communication channel and translation necessary for providing a real time simulation of the execution of debugging commands for efficient testing on a plurality of mobile devices that are remotely hosted.

In the interest of clarify and explanation, a web browser on a client device with a browser extension is described to illustrate the various embodiments. However, the embodiments are not limited as such. Instead, a standalone application configured to run on a local client device may perform functions similar to that of the web browser environment. Further, the cloud mobile device debugging service may include scalable servers that may host/implement a plurality of mobile devices/emulators according to embodiments described herein. The scalable nature of available mobile devices/emulators can aid in increased efficiency when dealing with a plurality of developers that need to test or debug various features on a plurality of different mobile devices at the same time.

FIG. 1 is an example workflow for a cloud mobile device debugging service, according to embodiments. The example workflow 100 of FIG. 1 may include a client device 102 in communication with a server 104 that implements the cloud mobile device debugging service. The client device 102 may communicate with the server 104 via one or more networks 106. The service server 104 may host or implement a mobile device and emulator fleet 108 that includes a variety of mobile devices (different models, hardware capabilities, operating systems, etc.) 110-116 and emulators 118 in a scalable cloud environment 120. The client device 102 may present a web browser 122 that receives and relays input (such as debugging commands) via the local agent (not pictured) to the service server 104. A web browser, such as web browser 122 may be a software application for retrieving, presenting, and traversing information resource on the World Wide Web where an information resource may be identified by a uniform resource locator (URL). The web browser 122 may also display a simulation 124 that represents the execution of the input on a particular mobile device (such as devices 110-116 or emulator 118). A simulation, such as simulation 124, may include a real time stream of the particular mobile device or emulator such as actions, interactions, input/output results that are taking place on the particular mobile device or, a rendered view of the particular mobile device that may include a series of screen captures via a screen cast application. An emulator, such as emulator 118 may include software or hardware that duplicates or emulates the functions of the operating system or any other application/network document browser that functions within the operating system of one computer system in another computer system. For example, the emulator 118 may be duplicated, by one computer system in communication with the server 104, the functions of an operating system for a particular mobile device on the server 104 for rendering on the client device 102.

For example, in FIG. 1 the web browser 122 includes the simulation area 124 that displays the real time view of the selected mobile device 126. The simulation 124 of FIG. 1 displays that the selected mobile device 126 is currently showing a mobile browser 128 of an item 130 provided by an electronic marketplace. The web browser 122 also includes a debug/testing area 132 that is configured for receiving input for testing and debugging the mobile browser 128 of the selected mobile device 126. The web browser 122 and debug/testing area can provide real time responses from the selected mobile device 126 based on the input provided. For example, a developer may utilize an interaction tool (such as a mouse pointer) to click on an element currently displayed on the mobile browser 128 (such as the item 130). In response, the debug/testing area may react by providing the corresponding HTML code for the item 130. The developer may utilize the real time responses to test/debug any elements, features, or objects displayed in the mobile browser 128 of the selected mobile device 126 that is remotely hosted by the service server 104.

As described herein, although a web browser 122 is described in FIG. 1 as displaying or presenting the simulation of the remotely hosted mobile device in real time the local agent may also utilize the user interface of a standalone application to provide similar functionality as that of the web browser 122. To further illustrate the features of the cloud mobile device debugging service utilizing the features of FIG. 1, a developer may utilize a local client device 102 to request a session or debugging session with a remotely hosted mobile device (110-116) or emulator (118) via one or more networks 106 from a service server 104. A debugging session may include an interactive session or communication channel that utilizes a query processor, a symbol resolver, an expression interpreter, and a debug support interface at a high level. Further, a debugging session may allow for step-by-step or single stepping program execution, stopping or breaking functionality to examine the current state of a program or script utilizing a breakpoint, and the ability to the track the values of variables through execution of the program/script. The debugging session may include the use of a console-based command line interface. If the requested device is available, the service server 104 may create a communication channel or debugging session with the local client device 102 via the local agent. Thereafter, a simulation 124 of the selected mobile device 126 may be provided for display to the developer via the web browser 122. The developer may then utilize the web browser 122 to provide input (such as debug or testing commands) in the debug/testing area 132 that will be relayed to the selected mobile device 126 via the local agent and one or more networks 106. The result or execution of the input on the selected mobile device 126 will then be provided in real time to the developer via the web browser 122.

Figure 2:
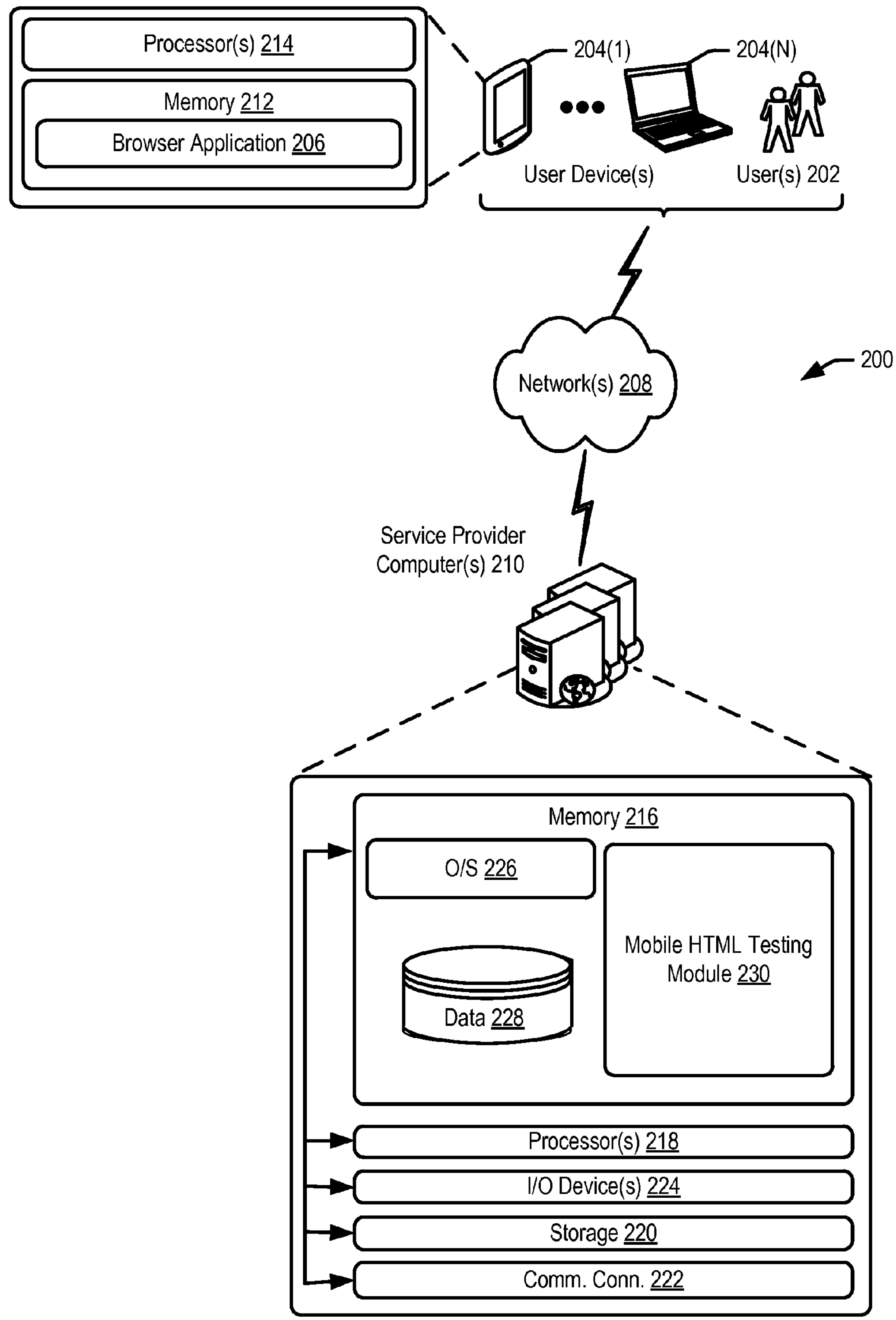
FIG. 2 illustrates an example computing architecture for a cloud mobile device debugging service, according to embodiments.

FIG. 2 illustrates an example computing architecture for a cloud mobile device debugging service, according to embodiments. In architecture 200, one or more users 202 (e.g., users, developers, or testers) may utilize user computing devices 204(1)-(N) (collectively, user devices 204 (e.g., local client devices 102)) to access a browser application 206 (e.g., a web browser 122) or a user interface (UI) accessible through the browser application 206, via one or more networks 208 (e.g., the one or more networks 106) to provide a debug session request and input related to the request, and receive output or simulation of an execution of the input on a remotely hosted mobile device as provided by the cloud mobile device debugging service described herein. The "browser application" 206 can be any browser control or native application that can access and display a network page or other information. In some aspects, the browser application 206 may display an interactive UI for requesting a debug session, providing input related to the request, and receive output or a simulation of a mobile browser of a particular mobile device executing provided debugging commands as described herein. A native application may include an application or program that has been developer for use on a particular platform (such as an operating system) or a particular device (such as a particular type of mobile device).

The architecture 200 may also include, one or more service provider computers 210 that may, in some examples, provide computing resources such as, but not limited to, client entities, low latency data storage, durable data storage, data access, management, virtualization, hosted computing environment or "cloud-based" solutions, electronic content performance management, etc. The one or more service provider computers 210 may also be operable to provide site hosting, computer application development, and/or implementation platforms, combinations of the foregoing, or the like to the one or more users 202.

In one illustrative configuration, the user computing devices 204 may include at least one memory 212 and one or more processing units or processor(s) 214. The processor(s) 214 may be implemented as appropriate in hardware, computer-executable instructions, firmware, or combinations thereof. Computer-executable instruction or firmware implementations of the processor(s) 214 may include computer-executable or machine-executable instructions written in any suitable programming language to perform the various functions described herein. The user devices 204 may also include geo-location devices (e.g., a global positioning system (GPS) device or the like) for providing and/or recording geographic location information associated with the user devices 204. The memory 212 may store program instructions that are loadable and executable on the processor(s) 214, as well as data generated during the execution of these programs. Depending on the configuration and type of user device 204, the memory 212 may be volatile (such as random access memory (RAM)) and/or non-volatile (such as read-only memory (ROM), flash memory, etc.). The user device 204 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the computing devices. In some implementations, the memory 212 may include multiple different types of memory, such as static random access memory (SRAM), dynamic random access memory (DRAM), or ROM.

Turning to the components of the memory 212 in more detail, the memory 212 may include an operating system and one or more application programs or services for implementing the features disclosed herein including providing mobile HTML testing and debugging for a remotely hosted mobile device that can be rendered and simulated on a local client device 204 and ultimately to the user 202 via the browser application 206, dedicated applications (e.g., smart phone applications, tablet applications, etc.), or through capabilities inherit to a device (e.g., user interfaces or touch input interfaces). Additionally, the memory 212 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 202 provided response to a security question or a geographic location obtained by the user device 204.

In some examples, the networks 208 may include any one or a combination of many different types of networks, such as cable networks, the Internet, wireless networks, cellular networks and other private and/or public networks. While the illustrated example represents the users 202 communicating with the service provider computers 210 and third party computers 216 over the networks 208, the described techniques may equally apply in instances where the users 202 interact with the one or more service provider computers 210 and/or the third party computers 216 via the one or more user devices 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

As described briefly above, the browser application 206 may allow the users 202 to interact with a simulation of a remotely hosted mobile device (such as a real time simulation of a mobile browser or application running on the remotely hosted mobile device) for testing/debugging purposes implemented by the one or more service provider computers 210 for executing the cloud mobile device debugging service as describe herein. The browser application 206 may be capable of handling requests from many users 202 and serving, in response, various user interfaces that can be rendered at the user devices 204 such as, but not limited to, a network site or network page. The browser application 206 can interact with any type of network site that supports user interaction, including social networking sites, electronic retailers, informational sites, blog sites, search engine sites, news and entertainment sites, electronic marketplaces, and so forth. The described techniques can similarly be implemented outside of the browser application 206, such as with other applications running on the user device 204.

The one or more service provider computers 210 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 210 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 210 may be in communication with the user device 204 via the networks 208, or via other network connections. The one or more service provider computers 210 may include one or more servers, perhaps arranged in a cluster or as individual servers not associated with one another.

In one illustrative configuration, the one or more service provider computers 210 may include at least one memory 216 and one or more processing units or processors(s) 218. The processor(s) 218 may be implemented as appropriate in hardware, computer-executable instructions, firmware, or combinations thereof. Computer-executable instruction or firmware implementations of the processor(s) 218 may include computer-executable or machine-executable instructions written in any suitable programming language to perform the various functions described when executed by a hardware computing device, such as a processor. The memory 216 may store program instructions that are loadable and executable on the processor(s) 218, as well as data generated during the execution of these programs. Depending on the configuration and type of the one or more service provider computers 210, the memory 216 may be volatile (such as RAM) and/or non-volatile (such as ROM, flash memory, etc.). The one or more service provider computers 210 or servers may also include additional storage 220, which may include removable storage and/or non-removable storage. The additional storage 220 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 216 may include multiple different types of memory, such as SRAM, DRAM, or ROM.

The memory 216, the additional storage 220, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 216 and the additional storage 220 are all examples of non-transitory computer storage media. Additional types of non-transitory computer storage media that may be present in the one or more service provider computers 210 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 210. Combinations of any of the above should also be included within the scope of non-transitory computer-readable media.

The one or more service provider computers 210 may also contain communication connection interface(s) 222 that allow the one or more service provider computers 210 to communicate with a data store, another computing device or server, user terminals and/or other devices on the networks 208. The one or more service provider computers 210 may also include I/O device(s) 224, such as a keyboard, a mouse, a pen, a voice input device, a touch input device, a display, speakers, a printer, etc.

Turning to the contents of the memory 216 in more detail and as will be described in further detail in FIG. 3, the memory 216 may include an operating system 226, one or more data stores 228, and/or one or more application programs or services for implementing the features disclosed herein including a mobile HTML testing module 230. In accordance with at least one embodiment, the mobile HTML testing module 230 may be configured to at least receive a request for a debugging session with a remotely hosted mobile device, initiate the debugging session with a local agent of a client device; receive input that corresponds to debugging/testing commands, and provide for display in the client device a simulation of a mobile browser/application of a particular mobile device that represents execution of the input.

Figure 3:
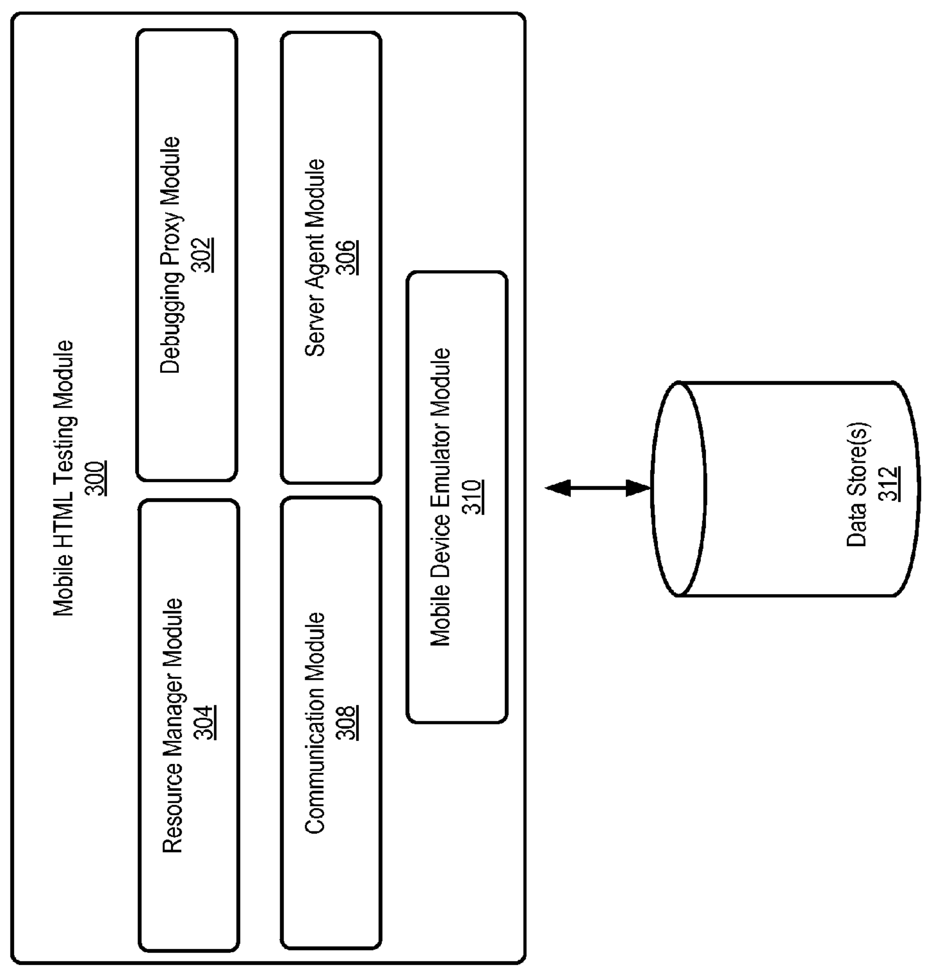
FIG. 3 illustrates an example mobile HTML testing module, according to embodiments.

FIG. 3 illustrates an example mobile hypertext markup language (HTML) testing module, according to embodiments. It should be noted that while multiple modules are described in the example mobile HTML testing module 300, the processes and methods described herein can be performed by more or less modules within memory such as memory 216 described above. The mobile HTML testing module 300 may be an example of the mobile HTML testing module 230 from FIG. 2. In addition, while the modules 300-310 included in the mobile HTML testing module 300 are displayed and described as distinct modules, in some embodiments they may be included within one another to further facilitate methods and systems described herein. In accordance with at least one embodiment, the mobile HTML testing module 300 may include a debugging proxy module 302, a resource manager module 304, a server agent module 306, a communication module 308, and a mobile device emulator module 310 in communication with one or more data stores 312 (which is an example of the one or more data stores 228 from FIG. 2).

In accordance with at least one embodiment, the debugging proxy module 302 may be configured to receive and translate input from a client device to an appropriate debugging protocol for execution on a remotely hosted mobile device/emulator. As described herein, a user/developer may provide input that corresponds to debugging/testing commands via a web browser on their client device. The provided debugging/testing commands may correspond to a particular debugging protocol yet require translation to another debugging protocol for appropriate execution on a selected mobile device/emulator. For illustrative purposes, a developer may wish to interact with a mobile browser on an iPhone 6 yet provide debugging/texting commands, via their local client and web browser that corresponds to an Android debugging protocol. In accordance with at least one embodiment, the debugging proxy module 302 may be configured to translate one or more debugging protocol messages communicated during a debugging session from a first debugging protocol to a second debugging protocol. It should be noted that during a debugging session input provided by a user may include communicating debugging protocol messages. In embodiments, the debugging proxy module 302 may be configured to receive the Android debugging protocol input and relay the commands to an appropriate debugging proxy (such as an iOS debugging proxy) for eventual execution on the iPhone 6, or the debugging proxy module 302 may translate the received input for eventual execution on the iPhone 6. In an embodiment, the debugging proxy module 302 may utilize mapping between the debugging protocols in order to translate or transform input provided in one debugging protocol to another. For example, the debugging proxy module 302 may utilize a mapping of method signatures between the debugging protocols to adhere to the appropriate debugging protocol required by the provisioned mobile device/emulator. In other embodiments, the debugging proxy module 302 may generate and provide parameters/variables as needed to adhere to certain debugging protocols for eventual execution. For example, the debugging proxy module 302 may utilize method signature definitions to determine that a particular debugging protocol requires parameters of a certain data type that were not provided by the user via the local agent. The debugging proxy 302 may determine and utilize an appropriate transformation from the nonconforming data type to a conforming data type according to the required debugging protocol. Further, the debugging proxy 302 may utilize input provided by the user, including parameters, to fulfill the required parameters utilized by a particular debugging protocol. The debugging proxy 302 may maintain a plurality of default parameters for use during translation from one debugging protocol to another if they were not provided by the user. In accordance with at least one embodiment, the debugging proxy module 302 may utilized parameters that were passed during the initiation of the debugging session in translating/transforming the debugging/testing commands provided by a user.

In an embodiment, the resource manager module 304 may be configured to receive debugging or interaction session requests from a local device of a user for a particular mobile device/emulator. The resource manager module 304 may obtain and maintain status information for a plurality of servers that are remotely hosting a plurality of mobile devices/emulators including a variety of models of mobile devices. The status information may include at least the availability of a device/emulator (in embodiments where a one session per device policy is implemented), specifications for the particular mobile device (screen size, connection speed, and CPU and memory capacities) and any suitable hardware and software capabilities. In embodiments, the resource manager module 304 may utilize an identifier of a particular mobile device/emulator and the maintained status information to select the appropriate server, server agent, and ultimately the particular mobile device to fulfill the debugging/interaction session request. The resource manager module 304 may, in response to receiving the session request and selecting an appropriate server agent/particular mobile device or emulator, respond to a local agent of the local device with information about the server remotely hosting the particular mobile device/emulator and an identification number for the mobile device/emulator. The local agent may utilize this information to directly connect with the server agent and a communication channel may be formed for relaying queries from the local device to a provisioned mobile device/emulator. In an embodiment, the resource manager module 304 may, in response to receiving a disconnect signal or end session request, perform a clean-up operation of the provisioned mobile device such as closing previously running mobile browsers, applications, etc.

In accordance with at least one embodiment, the server agent module 306 may be configured for receiving status information requests and providing status information for a plurality of remotely hosted mobile device/emulators to the resource manager module 304. In an embodiment, the server agent module 306 may be configured to rapidly scale available mobile devices/emulators in response to one or more session requests from a plurality of users/developers as described herein. In embodiments, the server agent module 306 may, upon fulfillment of a session request, receive input from a local agent on a client device from a user for execution on a particular mobile device. The server agent module 306 may select an appropriate debugging proxy for eventual execution of the input on the particular mobile device/emulator. The server agent module 306 may be configured to relay or extract output of the execution of the input on the provisioned particular mobile device/emulator to the local agent of the client device for display on a web browser/application on the client device. The server agent module 306 may be configured for relaying real time information or execution of the provisioned mobile device/emulator, such as a screen cast of the mobile device, for display on the web browser/application of the client device. In at least one embodiment, the server agent module 306 may be configured to capture snapshots at particular intervals of the provisioned mobile device executing the provided input. Alternatively, or in addition, the server agent module 306 may utilize media capture and encoding techniques such as video capture and encoding techniques for providing a media stream such as a video stream of execution of a native application running on the provisioned mobile device. In at least one embodiment, the server agent module 306 may receive input from the local agent that corresponds to a remote frame buffer protocol (RFB) that includes keyboard and mouse events from the client device associated with the local agent. For example, a media stream such as a video stream of the native environment of the provisioned mobile device, including a native application, may be presented to a user via a local agent. Subsequently, input provided by the user, including testing commands that include keyboard and mouse events, may be provided to the provisioned mobile device for execution and a result of the execution can be streamed back to the user. Although RFB protocols are described as being utilized, any suitable virtual network computing graphical sharing system may be used with embodiments described herein for receiving, providing, and/or executing input on a native application running on a remotely hosted mobile device.

In accordance with at least one embodiment, the communication module 308 may be configured for relaying status information to and from the server agent module 306 and the resource manager module 304. The communication module 308 may be configured for formatting or compressing simulation information of a provisioned mobile device/emulator from the server agent module 306 and the local agent of the client device (user side). The communication module 308 may be utilized during the relay of real time information between the local agent and the server agent module 306 upon a successful interaction/debugging session request is fulfilled. For example, the communication module 308 may be configured to buffer input from the local agent or output from the server agent module 306 in cases of connectivity problems lost packets, or loss of connection between the two actors during an interaction/debugging session. The buffered input/output may aid in the real-time simulation of the activity occurring on the provisioned mobile device to the web browser of the client device via the server agent module 306 and the communication between the server agent module 306 and local agent on the client device.

The mobile device emulator module 310 may be configured to maintain previously provisioned or just provisioned emulators for more efficient session request fulfillment. For example, the mobile device emulator module 310 may be configured to clear any caches, browsers, applications, and parameters passed during a previous session request. By keeping a previously provisioned emulator running without rebooting, restarting, or going through provision/de-provision steps for an interaction/debugging session that includes an emulator may more efficiently be fulfilled as boot up time for an instantiated emulator may take more time. The mobile device emulator module 310 may be configured to send status information via the server agent module 306 to the resource manager module 304 for aiding in the fulfillment of session requests. In an embodiment, the mobile device emulator module 310 may be configured to instantiate an emulator based on a session request to emulate the environment of a particular mobile device. The mobile device emulator module 310 may be configured to receiving parameters or environment variables for altering or updating the provisioned emulator environment. For example, a developer may wish to test/debug a mobile browser on a particular device under certain stress conditions such as reduced CPU, memory, storage, etc. The mobile device emulator module 310 may be configured to maintain any alteration from a base emulation environment of a phone for reset purposes after an interaction/debugging session is completed. In an embodiment, the mobile device emulator module 310 may be configured to perform a pre-screening operation on user provided parameters and input to ensure proper debugging protocol assignment and usage. For example, a user may provide a series of seed parameters, via the local agent, for use in launching a native application on a remotely hosted mobile device. The mobile device emulator module 310 may be configured to enable the usage of the seed parameters and provide a generated error message of the provided parameters cannot be executed in the launched application. Thus, a user can provide various parameters to launch an application on the provisioned mobile device/emulator according to desired conditions such as which screen in the application should be displayed first or a series of commands to be executed on launch that result in a particular aspect of the native application to be tested.

Figure 4:
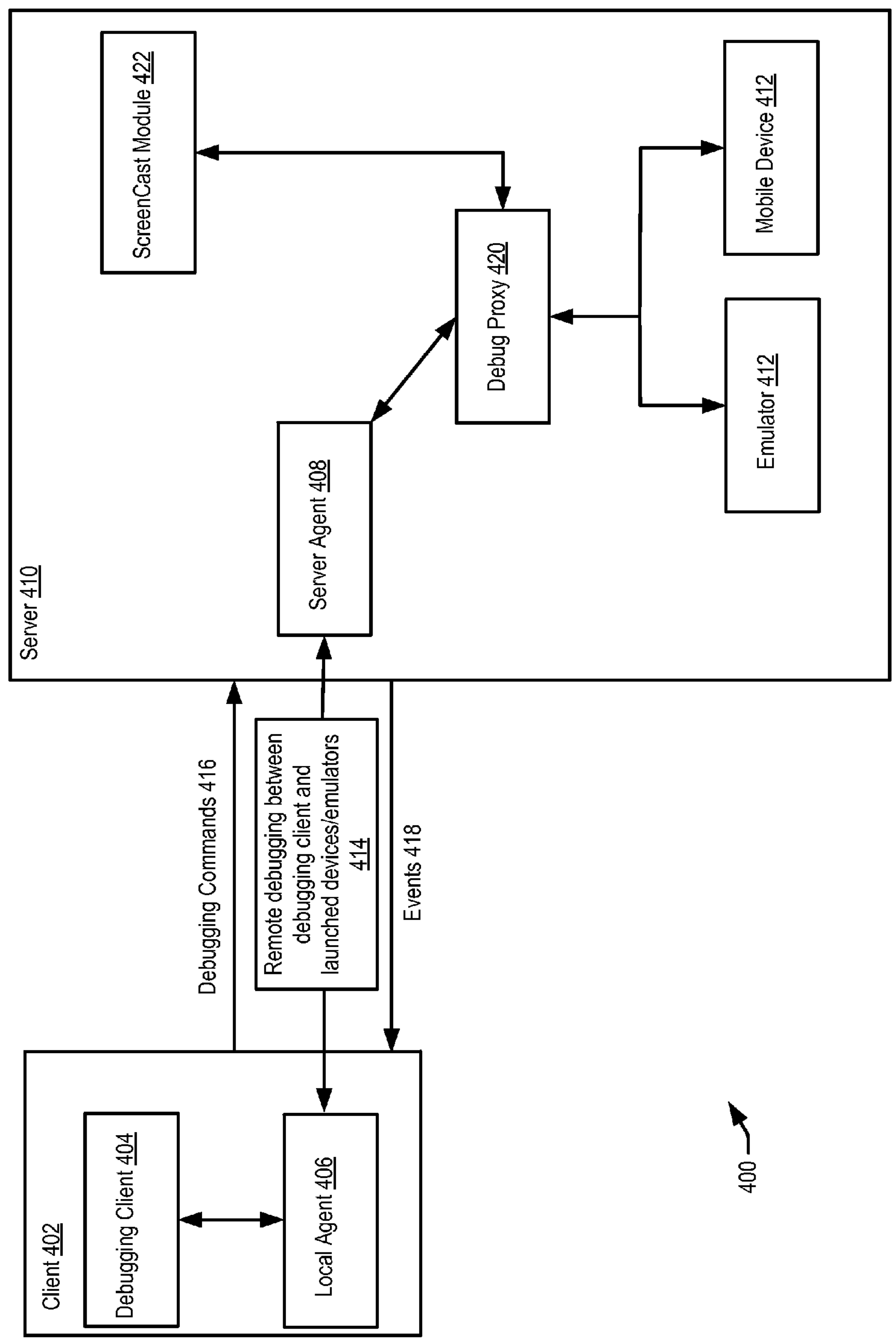
FIG. 4 illustrates an example workflow for a cloud mobile device debugging service, according to embodiments.

FIG. 4 illustrates an example workflow for a cloud mobile device debugging service, according to embodiments. The workflow 400 of FIG. 4 may include a client 402 such as client device 204 that implements or is configured to run a debugging client 404 and a local agent 406. In embodiments the debugging client 404 may include at least a web browser debugging client such as Chrome, Firefox, Safari, Internet Explorer, or any suitable application that can server as a standalone debugging client configured for receiving input. The local agent 406 may include at least a web browser extension that can interact with the server agent 408 of a server 410 (service provider computers 210) for providing mobile HTML testing and debugging for a remotely hosted mobile device that can be rendered and simulated on the client 402.

As described herein, the local agent 406 may be configured to receive input provided by a user via the client 402 and debugging client 404 and relay the input to a mobile device or emulator 412 via the server agent 408. As illustrated in FIG. 4, the mobile device or emulator 412 is remotely hosted by the server 410 thus enabling remote debugging 414 between the debugging client 404 and a launched or provisioned device/emulator 412. In accordance with at least one embodiment, the local agent 406 may request a particular device be launched or provisioned for an interaction/debugging session and upon fulfillment of the request the session may be created between the local agent 406 and the server agent 408. Thereafter, the local agent 406 may provide debugging commands 416 to the server agent 408 and receive output or events 418 resulting from the execution of the input on the mobile device emulator 412 from the server agent 408. In embodiments, the server agent 408 may select an appropriate debug proxy 420 for translating/transforming the debugging commands 416 from one debugging protocol to another for execution on the mobile device or emulator 412. In accordance with at least one embodiment, a screen cast module 422 may be configured to capture a real time simulation or stream of the mobile device or emulator 412 for streaming to the local agent 406 and eventually the debugging client 404 and client 402 via the server agent 408. Thus, the results, events 418, or output of the remote debugging between the debugging client 404 and the mobile device or emulator 412 may be displayed to the user via the local agent 406 and debugging client 404 from the server agent 408. The server agent 408 may be implemented by the server agent module 306 and the debug proxy may be implemented by the debugging proxy module 302 with communication between the local agent 406 and server agent 408 implemented by the communication module 308.

Figure 5:
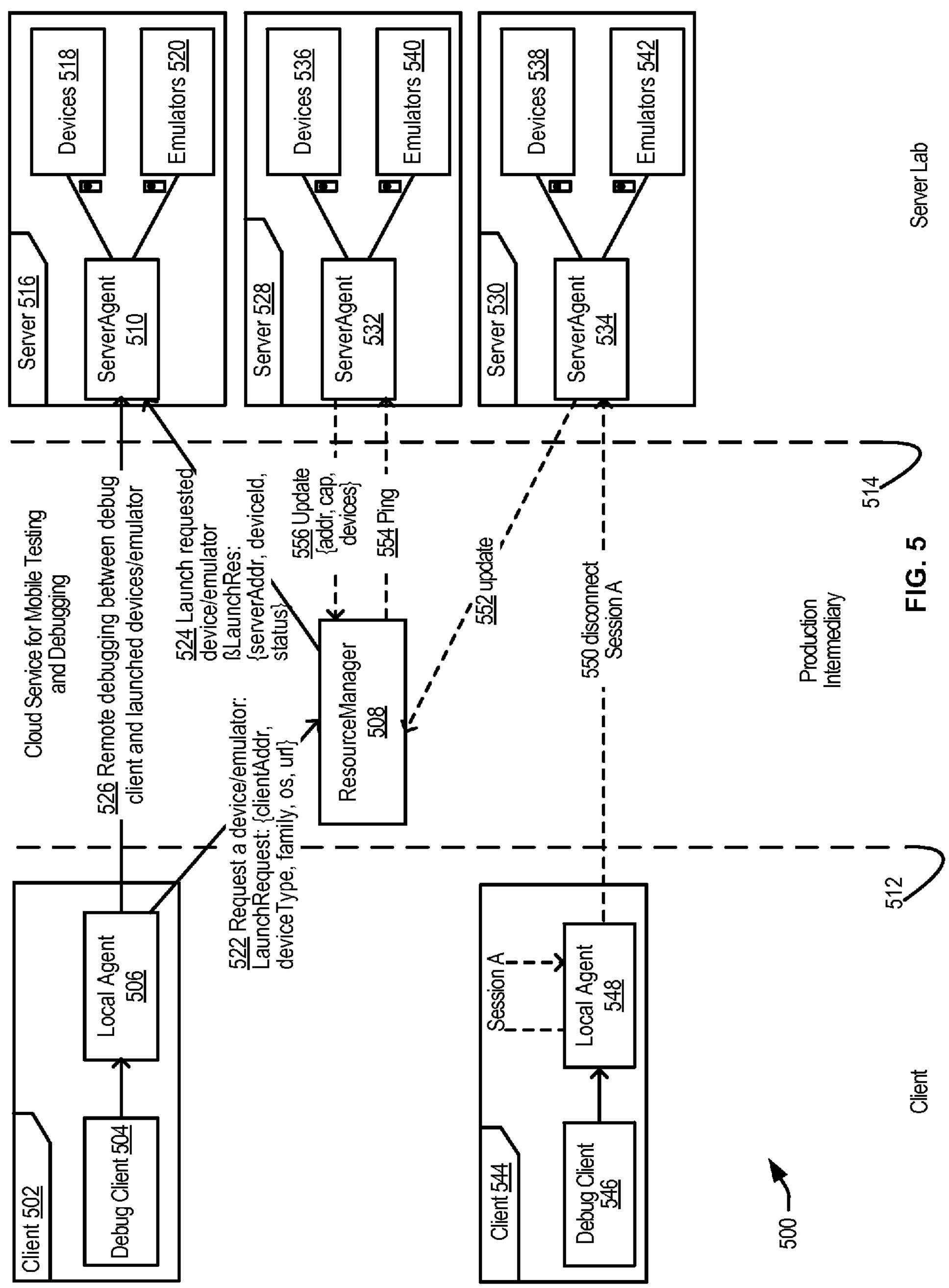
FIG. 5 illustrates an example workflow for a cloud mobile device debugging service, according to embodiments.

FIG. 5 illustrates an example workflow for a cloud mobile device debugging service, according to embodiments. The workflow 500 of FIG. 5 includes a client 502 that further includes a debug client 504 and local agent 506 in communication with a resource manager 508 and a server agent 510. The dashed lines 512 and 514 represent communications that occur over one or more networks such as networks 208. As described herein, the server agent 510 may be implemented by a server 516 that maintains and provisions one or more mobile devices 518 or mobile device emulators 520. A user may request a particular device emulator for launching or initiating a debugging session 522 via the debug client 504 and local agent 506. The request 522 may be provided to the resource manager 508 and include several parameters including at least an indicator of a request for a device or emulator, a client address for providing output of the session request, a requested operating system of the device, any uniform resource locators (URLs) that need to be launched on the provisioned device/emulator, or any other seeding parameters that can be passed to a launched application.

In an embodiment, the resource manager 508 may select an appropriate server agent, such as server agent 510 for fulfilling the debug session request 522. The resource manager 508 may select the appropriate server agent based on maintained status information for the devices 518 and emulators 520. Once an appropriate server agent is selected (510) a launch or provision request 524 may be provided to the server agent 510 for provisioning a particular device 518 or emulator 520 of the server 516. Thereafter, remote debugging between the debug client 504 and the launched provisioned devices/emulators 526 may be fulfilled as described herein. A user may provide debugging commands/input via the debug client 504 that will be relayed by the local agent 506 to the appropriate server agent 510 for execution on a device 518 or emulator 520. In response, the server agent 510 can provide any output or simulation of the events that occurred upon execution of the input on the devices 518 or emulators 520 to the local agent 506 for eventual display to the user via the debug client 504. Servers 528 and 530, which include their own server agents (532, 534), devices (536, 538), and emulators (540, 542) are included for illustrating that the embodiments described herein may operate in a scalable cloud environment for implementing a plurality of servers that remotely host a plurality of mobile devices/emulators for remote debugging as appropriate to meet demand of users. Further, an additional client session (session A) is illustrated that includes a client 544 (including a different debug client 546 and local agent 548) providing a disconnect request 550 to server agent 534.

As described herein, embodiments included in the cloud mobile device debugging service provide for maintaining status information for a plurality of devices for appropriate provision of devices and emulators for one or more session requests from one or more clients. For example, upon the local agent 548 providing a disconnect request 550 to the server agent 534, the server agent 534 may communicate the disconnect information to the resource manager 508 for updating the status 552 of a device 538 or emulator 542 in communication with the server agent 534. Thereafter, the resource manager 508 may receive a subsequent request for connecting to a device and the resource manager 508 may utilize the update status information 552 for selecting an appropriate device/emulator for fulfilling the request. In embodiments, the resource manager may obtain status information for devices/emulators (536, 540) via a ping status request 554. In response, a server agent, such as server agent 532, may provide updated status information 556 such as URL or address information for connecting to a particular device, any capacity limitations, available devices on server 528, or any suitable information that may be provided by a server implementing a plurality of devices and emulators.

Figure 6:
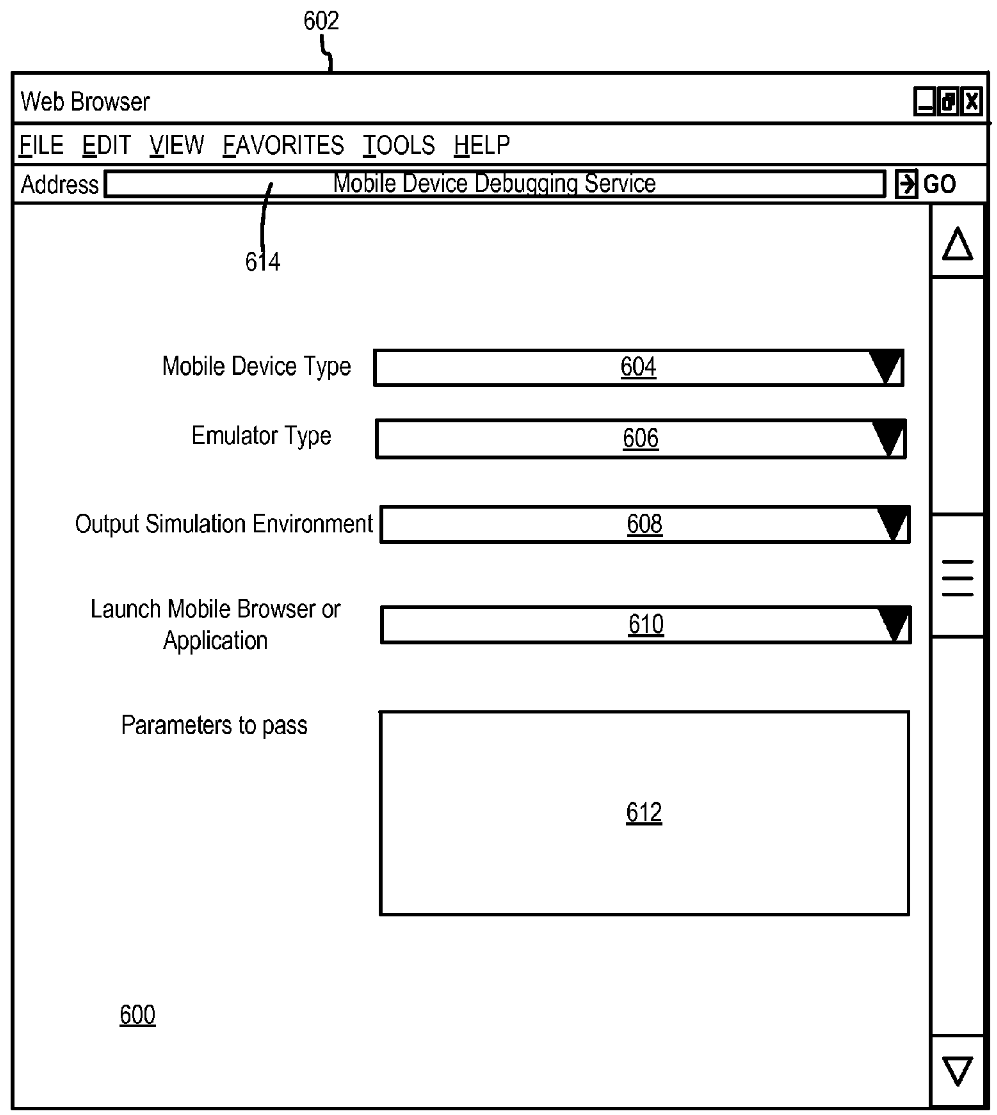
FIG. 6 illustrates an example cloud mobile device debugging service launch user interface, according to embodiments.

FIG. 6 illustrates an example cloud mobile device debugging service launch user interface, according to embodiments. The user interface 600 of FIG. 6 may be provided via a web browser 602 or via a standalone application configured to run on a client device as described herein. In accordance with at least one embodiment, the example user interface 600 for the cloud mobile device debugging server may include fields for selecting an a mobile device type 604 or emulator type 606, an output simulation environment 608 specifying whether the simulation of the remote debugging should be displayed in the web browser 602 or a separate application, a selection for launching a mobile browser or application 610 on a provisioned mobile device/emulator, and a space for entering any parameters 612 to pass with the launch request. Although a finite number of fields are illustrated in the user interface 600 of FIG. 6 the present disclosure may not be limited to only these fields. Other appropriate fields for a remote debugging launch request may be included in embodiments including providing attachments or files to communicate to the eventual provisioned mobile device for execution. In an embodiment, once a launch request has been fulfilled by the cloud mobile device debugging service, a URL may be provided by the server agent to the local agent for input into the web browser 602 in an address field 614 to connect to the debug/interaction session as described in FIG. 7.

Figure 7:
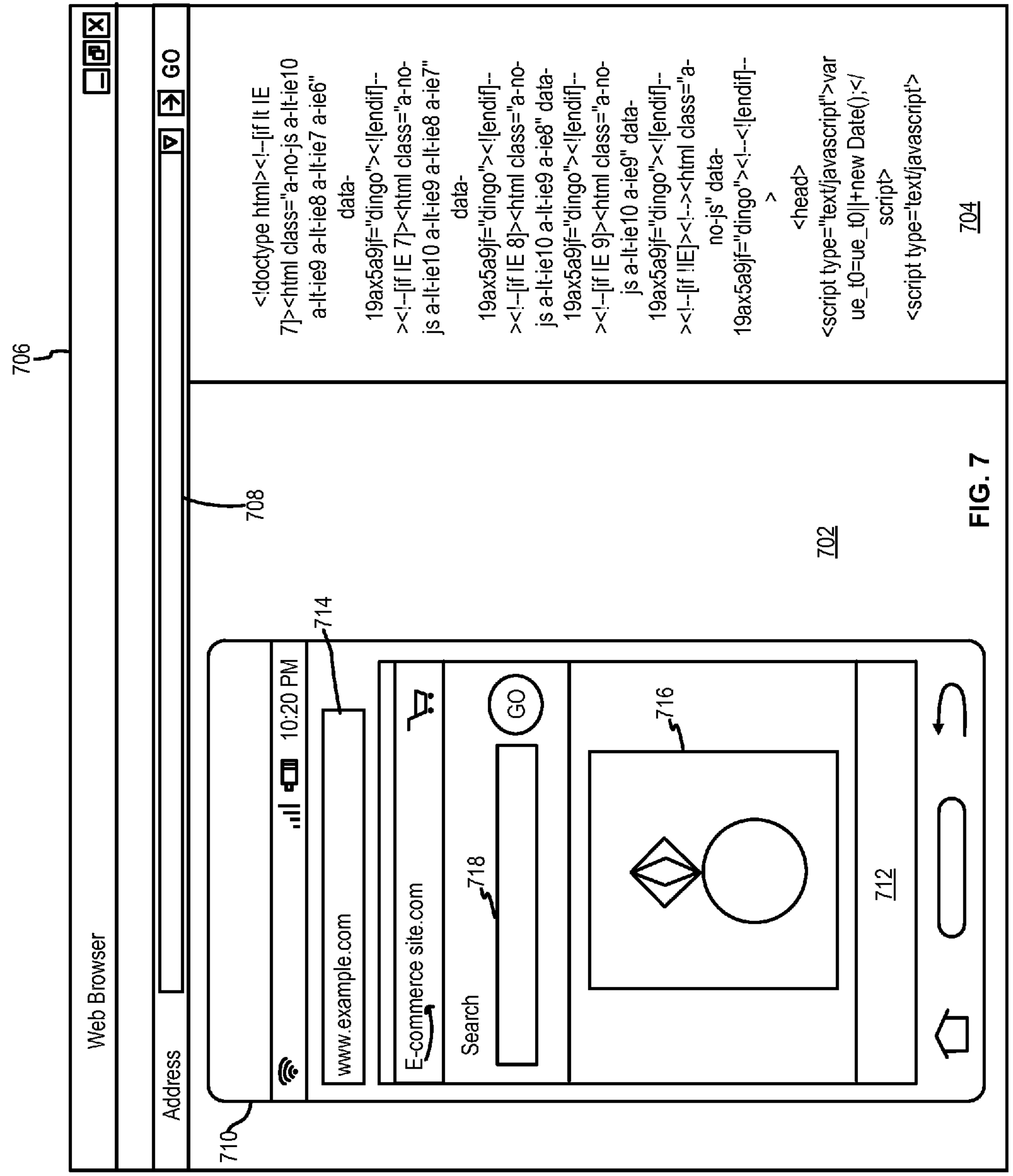
FIG. 7 illustrates an example user interface of a cloud mobile device debugging service via a web browser of a client device, according to embodiments.

FIG. 7 illustrates an example user interface of a cloud mobile device debugging service via a web browser of a client device, according to embodiments. FIG. 7 includes a simulation area 702 and a debug/input command area 704 displayed to a user via a web browser 706. As described above, the web browser 706 may be the debug client running on a client and interacting with a local agent such as a web browser extension. Further, the web browser 706 may include an address field 708 for inputting the previously described URL for initiating the debug/interaction session. As illustrated in FIG. 7, the simulation area 702 includes a simulation that represents a provisioned mobile device 710. The simulation of provisioned mobile device 710 displays in real time a mobile browser 712 that has connected to a certain URL 714 which provides an e-commerce site including an interactive element/object of the mobile browser 712 such as the element/object 716. As described herein, a user may provide debug commands/input in the input area 704 that will be relayed via the local agent to the server agent and eventually a particular mobile device such as 710 for execution. The results or output of the execution of the provided input can be provided for display in the simulation area 702 for real time remote debugging of a particular mobile device/emulator. Further, a user may interact with the simulation of the mobile device 710 in the simulation area 702 with an interactive tool (such as a mouse) and be provided with programmatic code (e.g., HTML code, cascading style sheet code, scripting language code, and/or any suitable programming language code executable by an interpreter and/or computer processor such as a central processing unit) that corresponds to the interacted area. For example, a developer may interact with the search bar 718 and be provided the corresponding programmatic code for the search bar 718 in the input area 704 for debugging or testing. In embodiments, the input provided in the input area 704 may adhere to a particular debugging protocol supported by the web browser 706 (debug client such as debug client 404) that is different from the debugging protocol required for the provisioned mobile device 710. As described herein, the cloud mobile device debugging service provides for communication, translation, and execution of the provided input on the selected/provisioned mobile device via a server agent, debugging proxies, and appropriate mobile devices. Thus, a remotely provisioned mobile device/emulator may be rendered in such a way to provide for remote debugging of mobile browsers or applications on any suitable client device/local client that utilizes the described local agent and cloud mobile device debugging service as described herein.

FIGS. 8-11 illustrate example flows for a cloud mobile device debugging service, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 8:
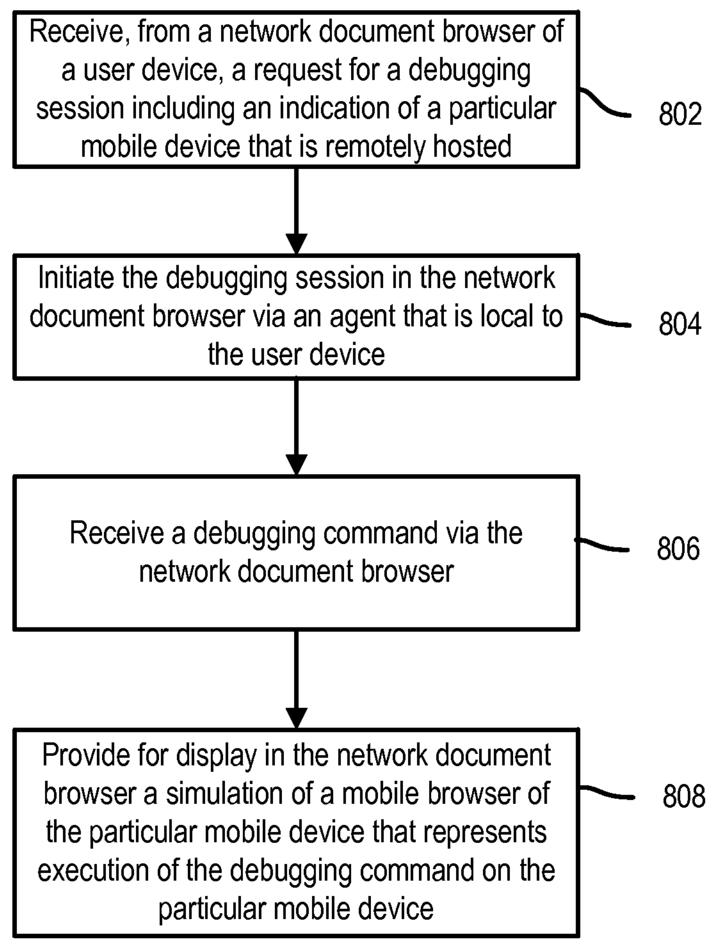
FIG. 8 illustrates an example flow for a cloud mobile device debugging service, according to embodiments.

In some examples, the one or more service provider computers 210 (e.g., utilizing at least one of the mobile HTML testing module 300, the debugging proxy module 302, the resource manager module 304, the server agent module 306, the communication module 308, and the mobile device emulator module 310 in communication with one or more data stores 312) shown in FIGS. 2 and 3, may perform the processes 800, 900, 1000, 1100 of FIGS. 8-11. In FIG. 8, the process 800 may include receiving a request for a debugging session including an indication of a particular mobile device that is remotely hosted at 802. In an embodiment, the request may be received from a network document browser of a user device (such as device 204) and the particular mobile device may be remotely hosted with respect to the user device. The process 800 may include initiating the debugging session in the network document browser of the user device via an agent that is local to the user device at 804. As described herein, the debugging session may include communications between the agent that is local to the user device and a server agent that is in communication with the particular mobile device. The process 800 may include receiving a debugging command via the network document browser at 806. In embodiments, the debugging command may be formatted or correspond to a particular debugging protocol that is different from the debugging protocol required by the particular mobile device. The process 800 may conclude at 808 by providing for display in the network document browser a simulation of a mobile browser of the particular mobile device that represents execution of the debugging command on the particular mobile device. In accordance with at least one embodiment, the simulation of the execution of the input may include providing, by the server agent, screen cast captures of the particular mobile device executing the input provided by a user or developer to debug/test an element or object of a mobile network document browser.

Figure 9:
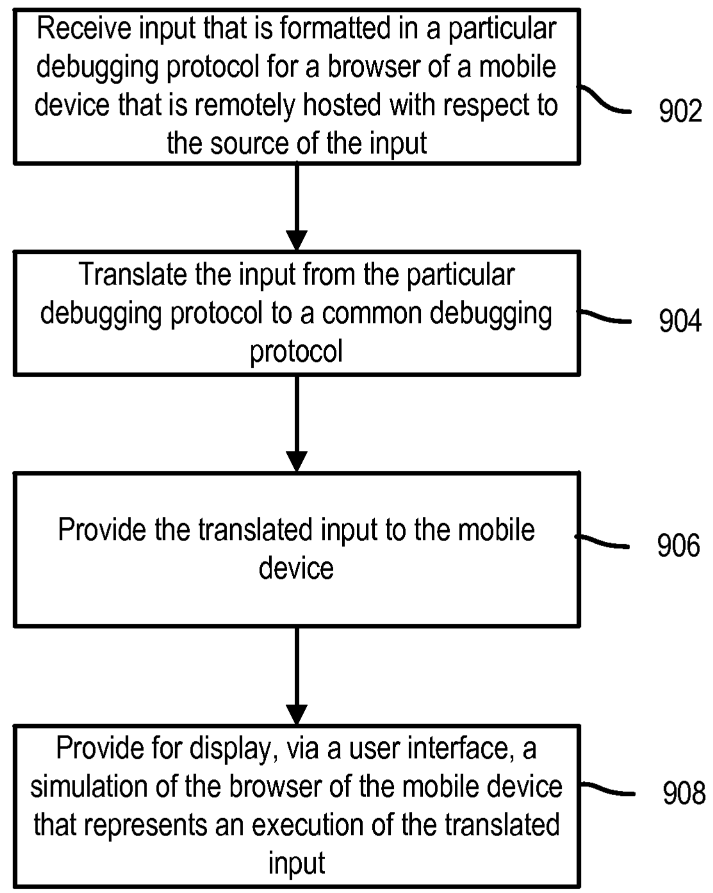
FIG. 9 illustrates an example flow for a cloud mobile device debugging service, according to embodiments.

In FIG. 9 the process 900 may include receiving input that is formatted in a particular debugging protocol for a browser of a mobile device that is remotely hosted with respect to the source of the input at 902. In an embodiment, the received input may be formatted according to a common debugging protocol and translated by a debugging proxy to a particular debugging protocol for execution on a particular type of mobile device that is remotely hosted in relation to the user and the user device. The process 900 may include translating the input from the particular debugging protocol to a common debugging protocol at 904. As described herein, a server agent component may select an appropriate debugging protocol for translating the input based on information provided during the request for a debugging/interaction session, the format of the input received, or the type of mobile device/emulator that will be executing the input. The process 900 may include providing the translated input to the mobile device at 906. In an embodiment, the translated input may be executed on a particular mobile device that was previously requested by a user. The input may be provided for execution on a particular application that is configured to run on the provisioned mobile device/emulator and include parameters that are passed to the application for execution. The process 900 may conclude at 908 by providing for display a simulation of the browser of the mobile device that represents an execution of the translated input. The simulation may be provided for display via a user interface that is on a user device and remote from the particular mobile device. In some embodiments, the simulation is configured for receiving further input such as interaction by the user utilizing an interaction tool (mouse pointer) and providing further execution of operations on the particular mobile device to be presented via the user interface for debugging/testing purposes.

Figure 10:
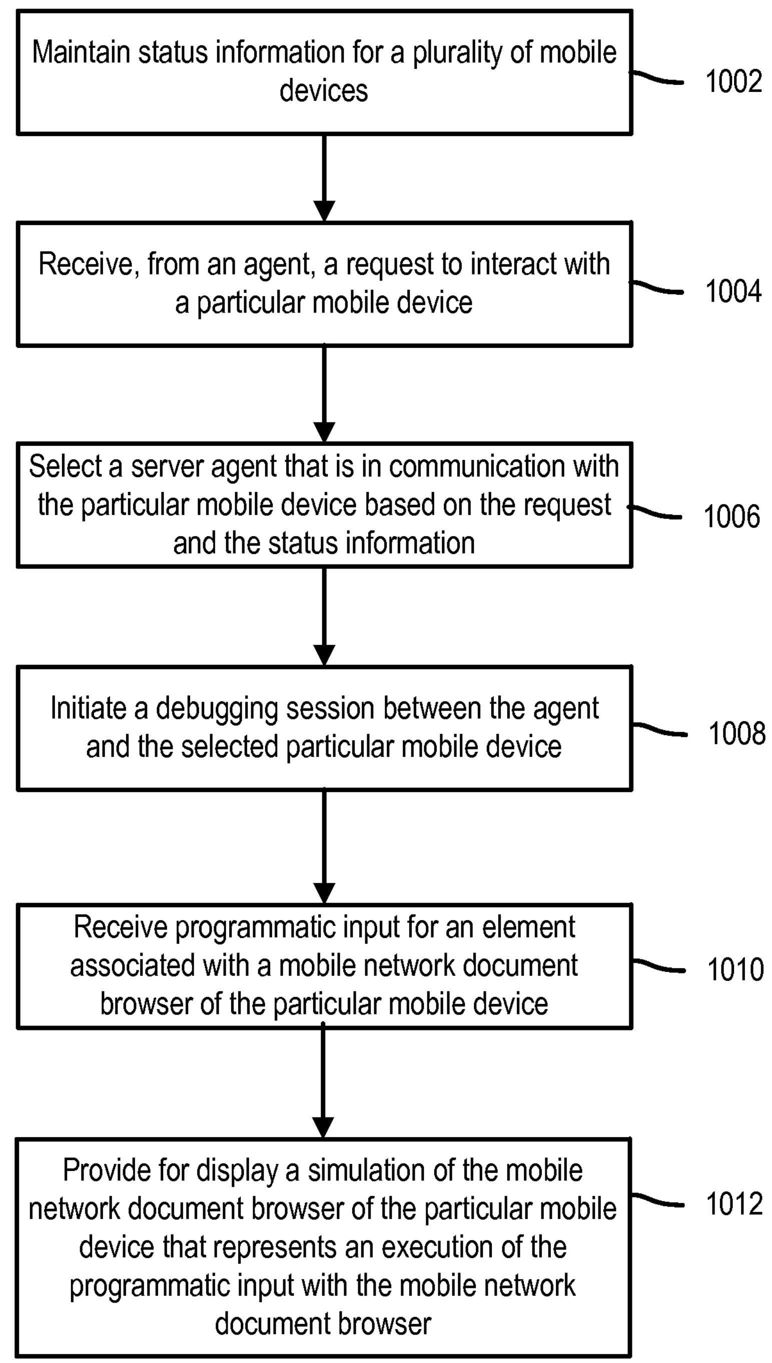
FIG. 10 illustrates an example flow for a cloud mobile device debugging service, according to embodiments.

In FIG. 10 the process 1000 may include maintaining status information for a plurality of mobile devices at 1002. In an embodiment, status information may include availability of each mobile device/emulator (whether another user is currently conducting a session with the device/emulator), connection speed, and particular specifications of each device such as CPU, memory, storage, etc. The process 1000 may include receiving, from an agent, a request to interact with a particular mobile device 1004. The agent may be configured to run locally on a user device and relay input messages between the user/developer and the selected server agent as described herein. The user may select a particular type of mobile device that is remotely hosted or an emulator that emulates an environment that corresponds to the particular type of mobile device. As used herein the phrase "type of mobile device" may include any model of mobile device or a mobile device that has particular hardware specifications. The process 1000 may include selecting a server agent that is in communication with the particular mobile device based on the request and the status information at 1006. In an embodiment, a resource management component may select an appropriate sever agent to fulfill the request to interact with the particular mobile device based on the status information that is maintained and the particulars of the request (type of mobile device/emulator requested).

The process 1000 may include initiating a debugging session between the agent and the selected particular mobile device at 1008. In some embodiments, a resource management component/module (304) may provide information to the agent running on the user device that enables the agent and the server agent to communicate with one another. For example, the resource management module 304 may provide a URL or internet protocol (IP) address for the local agent to utilize for forming a communication channel to relay debugging queries and results. The process 1000 may include receiving programmatic input for an element associated with a mobile network document browser of the particular mobile device at 1010. In an embodiment, the programmatic input can adhere to a particular debugging protocol and be provided by the developer utilizing a user interface provided in a network document browser or application. The process 1000 may conclude at 1012 by providing for display a simulation of the mobile network document browser of the particular mobile device. The simulation may represent the execution of the programmatic input with the mobile network document browser.

Figure 11:
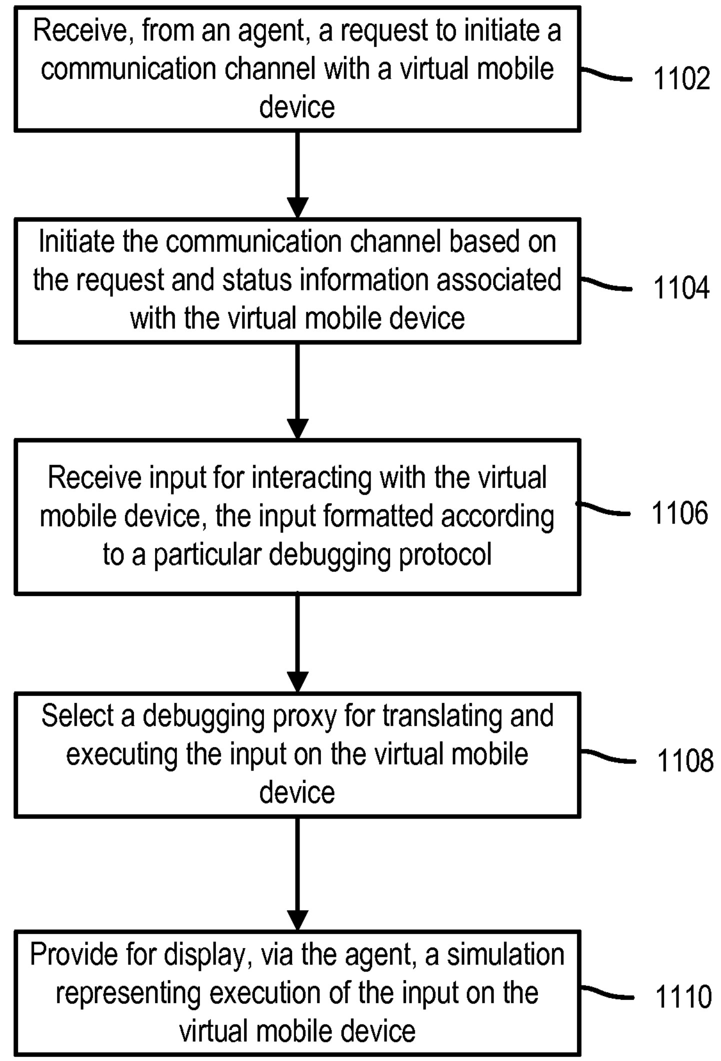
FIG. 11 illustrates an example flow for a cloud mobile device debugging service, according to embodiments.

In FIG. 11 the process 1100 may begin by receiving, from an agent, a request to initiate a communication channel with a virtual mobile device at 1102. In accordance with at least one embodiment, the communication channel may be requested by a user for testing, debugging, or interacting with a remotely hosted mobile device/emulator. The process 1100 may include initiating the communication channel based on the request and status information associated with the virtual mobile device. As described herein, the cloud mobile device debugging service may maintain status information for a plurality of virtual mobile devices including availability. The process 1100 may include receiving input for interacting with the virtual mobile device at 1106. The input may be formatted or adhere to a particular debugging protocol that may be different from the particular debugging protocol required by the provisioned virtual mobile device. The process 1100 may include selecting a debugging proxy for translating and executing the input on the virtual mobile device at 1108. In an embodiment, a server agent module 306 may select an appropriate debugging proxy for translating and executing the input with the provisioned mobile device based on the debugging protocol required for the provisioned mobile device. The process 1100 may conclude at 1110 by providing for display, via the agent, a simulation representing executing of the input on the virtual mobile device.

Figure 12:
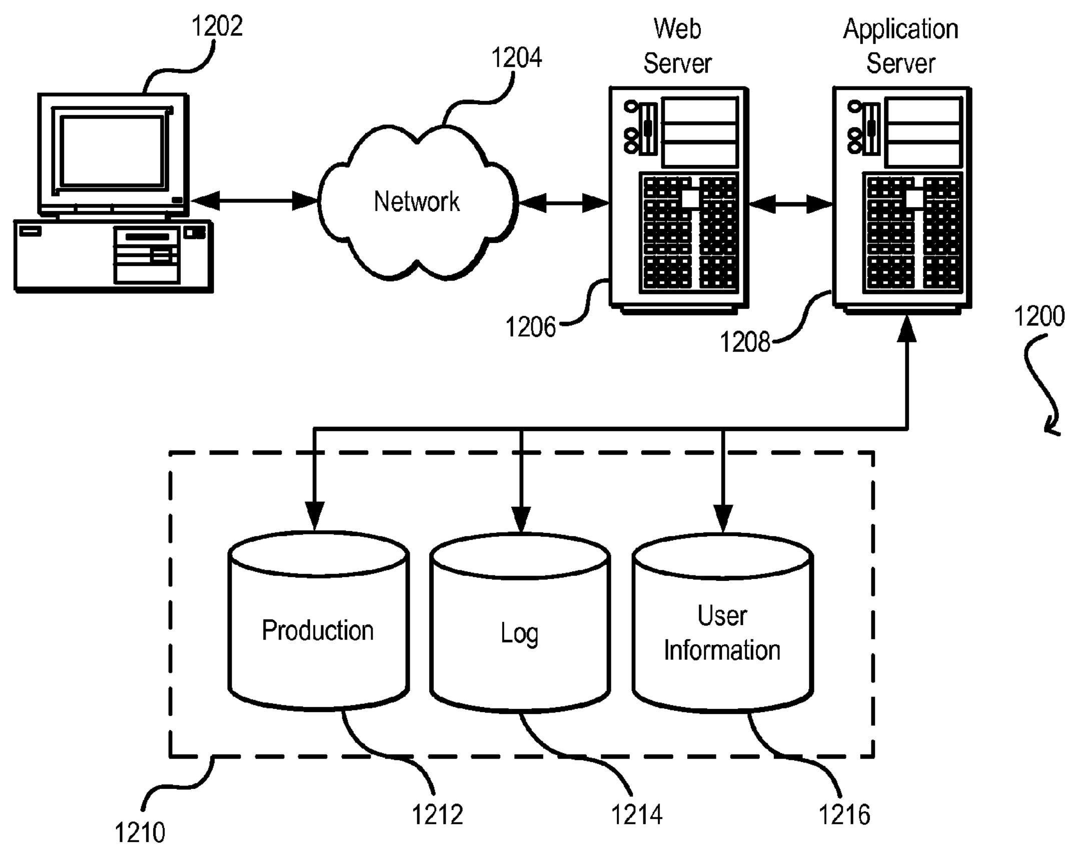
FIG. 12 illustrates an environment in which various embodiments can be implemented.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there could be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of Hypertext Markup Language ("HTML"), Extensible Markup Language ("XML") or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there may be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

receiving, from a network document browser of a user device, a request for a debugging session including an indication of a particular mobile device that is remotely hosted with respect to the user device;

initiating, by a computer-implemented agent on the user device, the debugging session in the network document browser, the computer-implemented agent configured to relay a debugging command between the user device and the particular mobile device;

receiving, by the computer-implemented agent, the debugging command via the network document browser of the user device;

translating, by the computer-implemented agent, the debugging command from a common debugging protocol to a particular debugging protocol for the particular mobile device; and in response to providing, via the computer-implemented agent, the debugging command to the particular mobile device:

providing for display, via the network document browser of the user device, a result of an execution of the debugging command by a mobile browser of the particular mobile device.

2. The computer-implemented method of claim 1, further comprising providing for display, via the network document browser of the user device, programmatic code that corresponds to the execution of the debugging command on the mobile browser of the particular mobile device.

3. The computer-implemented method of claim 2, wherein the providing for display includes providing for display the programmatic code for an object in response to receiving input that indicates an interaction with the object included in the mobile browser.

4. The computer-implemented method of claim 1, wherein the computer-implemented agent on the user device includes a network document browser extension.

5. The computer-implemented method of claim 1, wherein the particular mobile device includes an emulator corresponding to the particular mobile device that is remotely hosted with respect to the user device.

6. A non-transitory computer-readable storage medium storing computer-executable instructions that, when executed by a computer system, configure the computer system to perform operations comprising:

receiving, via a user interface, input that is formatted in a particular debugging protocol for a browser of a mobile device, the mobile device being remotely hosted with respect to a source of the received input;

translating the input from the particular debugging protocol to a common debugging protocol for a plurality of types of mobile devices utilizing a mapping of method signatures between the particular debugging protocol and the common debugging protocol;

providing the translated input to the mobile device; and providing for display, via the user interface, a result of executing the translated input with the mobile device.

7. The non-transitory computer-readable storage medium of claim 6, the operations further comprising providing for display a series of screen captures of the browser of the mobile device that represent the result of executing the translated input with the mobile device.

8. The non-transitory computer-readable storage medium of claim 6, wherein the plurality of types of mobile devices include at least one of: different models of mobile devices, different hardware specifications of a type of mobile device, or different software specifications of the type of the mobile device.

9. The non-transitory computer-readable storage medium of claim 6, wherein providing for display, via the user interface, the result of executing the translated input with the mobile device includes translating the input from the common debugging protocol to the particular debugging protocol.

10. The non-transitory computer-readable storage medium of claim 6, wherein the user interface is part of an application configured to execute on a user device.

11. The non-transitory computer-readable storage medium of claim 6, wherein translating the input from the particular debugging protocol to the common debugging protocol includes generating and providing parameters associated with the common debugging protocol that were not included in the input received from the user interface.

12. The non-transitory computer-readable storage medium of claim 6, the operations further comprising:

receiving application input that corresponds to commands supported by an application that is configured to execute on the mobile device;

providing the application input to the application on the mobile device; and providing for display, via the user interface, a result of execution of the application input in the application that is configured to execute on the mobile device.

13. A computer system, comprising:

a processor; and memory in communication with the processor, the memory including computer-executable instructions that, when executed with the processor, cause the computer system to at least:

provide a user interface component for a network document browser, the user interface component configured for relaying messages to a virtual mobile device that is remotely hosted; and in response to receiving input corresponding to a debugging command, the input translated from a particular debugging protocol to a common debugging protocol for a plurality of types of mobile devices:

cause execution of the received input on the virtual mobile device; and provide for presentation, via the network document browser, a result that represents a state of the virtual mobile device with respect to execution of the received input.

14. The computer system of claim 13, wherein the computer-executable instructions, when executed by the processor, cause the computer system to further provide for presentation, via the network document browser, a user interface for selecting the virtual mobile device or a particular type of mobile device from among a plurality of types of mobile devices that are remotely hosted and an output simulation environment for providing the result.

15. The computer system of claim 13, wherein causing execution of the received input includes executing the received input on an application native to the virtual mobile device.

16. The computer system of claim 15, wherein the input includes a seed parameter for use launching the application native to the virtual mobile device.

17. The computer system of claim 16, wherein the computer-executable instructions, when executed by the processor, cause the computer system to further utilize the seed parameter with a network document browser of the virtual mobile device or the application native to the virtual mobile device.

18. The computer system of claim 15, wherein the user interface component for the network document browser is configured for receiving interaction input that corresponds to a command provided by a user interacting with a representation of the application native to the virtual mobile device that is provided via the network document browser.

19. The computer system of claim 18, wherein providing for presentation, via the network document browser, the result that represents the state of the virtual mobile device executing the received input includes an area for presenting programmatic code that corresponds to execution of the received input on the virtual mobile device.

* * * * *